(12) United States Patent
Huang et al.

(10) Patent No.: US 7,933,231 B1
(45) Date of Patent: Apr. 26, 2011

(54) CONFIGURATION OF DEVICES USING LAYER 2 PROTOCOL

(75) Inventors: Kuo-Hao Huang, Taipei (TW); Jin-Shi Lee, Taipei (TW); Jia-Yung Lin, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 599 days.

(21) Appl. No.: 11/315,726

(22) Filed: Dec. 21, 2005

(51) Int. Cl.
*H04H 20/71* (2008.01)
*H04J 3/26* (2006.01)
*H04L 12/28* (2006.01)

(52) U.S. Cl. .................. 370/312; 370/432; 709/220
(58) Field of Classification Search ............ 370/254; 709/220
See application file for complete search history.

(56) References Cited

U.S. PATENT DOCUMENTS

| | | | | |
|---|---|---|---|---|
| 4,725,834 | A * | 2/1988 | Chang et al. ............... | 370/451 |
| 7,447,156 | B2 * | 11/2008 | Rajahalme ............... | 370/238 |
| 2002/0007238 | A1 * | 1/2002 | Moriguchi et al. ........ | 701/36 |
| 2002/0060995 | A1 * | 5/2002 | Cervello et al. ........... | 370/332 |
| 2003/0219030 | A1 * | 11/2003 | Gubbi ..................... | 370/442 |
| 2005/0044196 | A1 * | 2/2005 | Pullen et al. ............. | 709/223 |
| 2006/0159032 | A1 * | 7/2006 | Ukrainetz et al. ......... | 370/254 |

FOREIGN PATENT DOCUMENTS

EP 1463359 A1 * 9/2004

OTHER PUBLICATIONS

Andrew Tanenbaum, Computer Networks, Fourth Edition, Chapter 1, Section 4, "Reference Models", Pretence Hall, Aug. 9, 2002.*
Author Unknown, ANSI/IEEE Std 802.11, Part 11: Wireless LAN Medium Access Control and Physical Layer Specifications, pp. 1, 34-58, 70-73 and 93-97, 1999.*

* cited by examiner

*Primary Examiner* — Daniel J Ryman
*Assistant Examiner* — Christopher Crutchfield
(74) *Attorney, Agent, or Firm* — IP Strategy Group, P.C.

(57) ABSTRACT

Systems and methods for configuring a set of devices at layer 2 are disclosed. The configuration employs a deployment tool disposed at the computer and a deployment agent disposed at the devices. Using DLTP (Data Layer Transport Protocol), network discovery and configuration data transfer are facilitated even if the devices do not have IP addresses or protocol drivers to communicate at layer 3. Each deployment agent automatically configures its associated device after receiving the configuration data via layer 2. Other embodiments permit configuration of devices using data stored in a portable storage apparatus. In this manner, devices can be configured automatically without the need to manually configure devices one-by-one.

15 Claims, 5 Drawing Sheets

CONFIGURATION OF DEVICES USING LAYER 2 PROTOCOL

BACKGROUND OF THE INVENTION

The present invention relates to the configuration of devices. More particularly, the present invention relates to configuring multiple devices in a manner that is efficient and cost-effective.

Networked devices, such as routers, hubs, bridges, and even some consumer electronic devices, need to be configured before they can operate satisfactorily in a networked environment. One of the most common methods of configuring a device is through the use of a computer and a browser thereon.

In a typical example, the device to be configured is connected to an Ethernet port on the computer. The user may then turn the computer on and set the computer's IP address to a temporary IP address that the device would recognize. For example, the user may employ a network setting utility in the WINDOWS™ operating system (available from Microsoft Corporation of Redmond, Wash.) to set the static IP address and subnet mask of the computer.

After the computer's IP address is set, the user may then turn on the device and opens a browser of the computer to establish communication with the device. For example, the user may enter into the browser address field the IP address of the device. Note that since there can only be one device on the network with a given IP address, this approach precludes the configuration of multiple devices having the same IP address simultaneously. At any rate, if the correct IP address is entered, a configuration screen for the device would appear, allowing the user to enter configuration parameters for the device. The user may then follow the instructions in the configuration screen(s) to complete the configuration of the device.

Although the aforementioned method is quite popular with users nowadays, such method may not be suitable for large-scale configuration needs. For example, some companies may have a need to configure hundreds or thousands of devices. Although it is possible to employ the previously mentioned technique to configure the devices one-by-one, such an approach is time-consuming and costly.

Furthermore, for devices that do not have an IP address or the appropriate protocol driver to communicate at OSI (Open System Interconnect) layer 3, such device may not be communicate with the computer's browser to begin the configuration process. For these situations, a new approach to configuring devices is needed.

SUMMARY OF INVENTION

The invention relates, in an embodiment, to a method in a computer for configuring a set of devices coupled to the computer. The method includes broadcasting on a data link layer using at least a first DLTP (Data Link Transport Protocol) packet, a first media access controller address (MAC address) associated with the computer. The method further includes receiving on the data link layer via at least a second DLTP packet a second MAC address associated with a first device of the set of devices. The method additionally includes transferring on the data link layer using at least a third DLTP packet configuration data for the first device, the transferring utilizing the second MAC address as a destination address for the third DLTP packet.

In another embodiment, the invention relates to a method in a device for configuring the device using data received from a portable storage apparatus. The method includes providing deployment logic in the device, the deployment agent being configured to automatically execute when the portable storage apparatus is coupled to the device. The method also includes receiving a configuration file, using the deployment logic, from the portable storage apparatus, the configuration file including at least a plurality of entries, each of the plurality of entries including at least a unique identifier and a set of configuration parameters. The method additionally includes ascertaining, using the deployment logic, a matching entry among the plurality of entries, the matching entry having a unique identifier that matches a unique identifier associated with the device. The method further includes ascertaining, using the deployment logic, configuration parameters associated with the unique identifier that matches the unique identifier associated with the device. The method also includes configuring, using the deployment logic, the device using the configuration parameters associated with the unique identifier that matches the unique identifier associated with the device.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the invention, there are provided systems and methods for configuring devices using the OSI's Layer 2 (the data link layer) protocol instead of Layer 3 protocol (the network layer). Since embodiments of the invention do not rely on Layer 3 to perform the configuration task, configuration is possible even if the device does not have an IP address or a protocol driver to communicate with the configuring computer via the browser (i.e., via layer 3). Since the configuration occurs at layer 2, there is no need to temporarily set the computer's IP address to that required for configuration of the attached device and to reset the computer's IP address back when configuration is complete. Furthermore, embodiments of the invention render it possible to configure multiple devices automatically without having to manually configure each device as in the case with the prior art.

In an embodiment, a Data Link Transport Protocol (DLTP) is provided to communicate with the device(s) being configured. Further, there is provided a DLTP packet format capable of supporting automatic and simultaneous configuration of multiple devices using layer 2.

Figure 1:
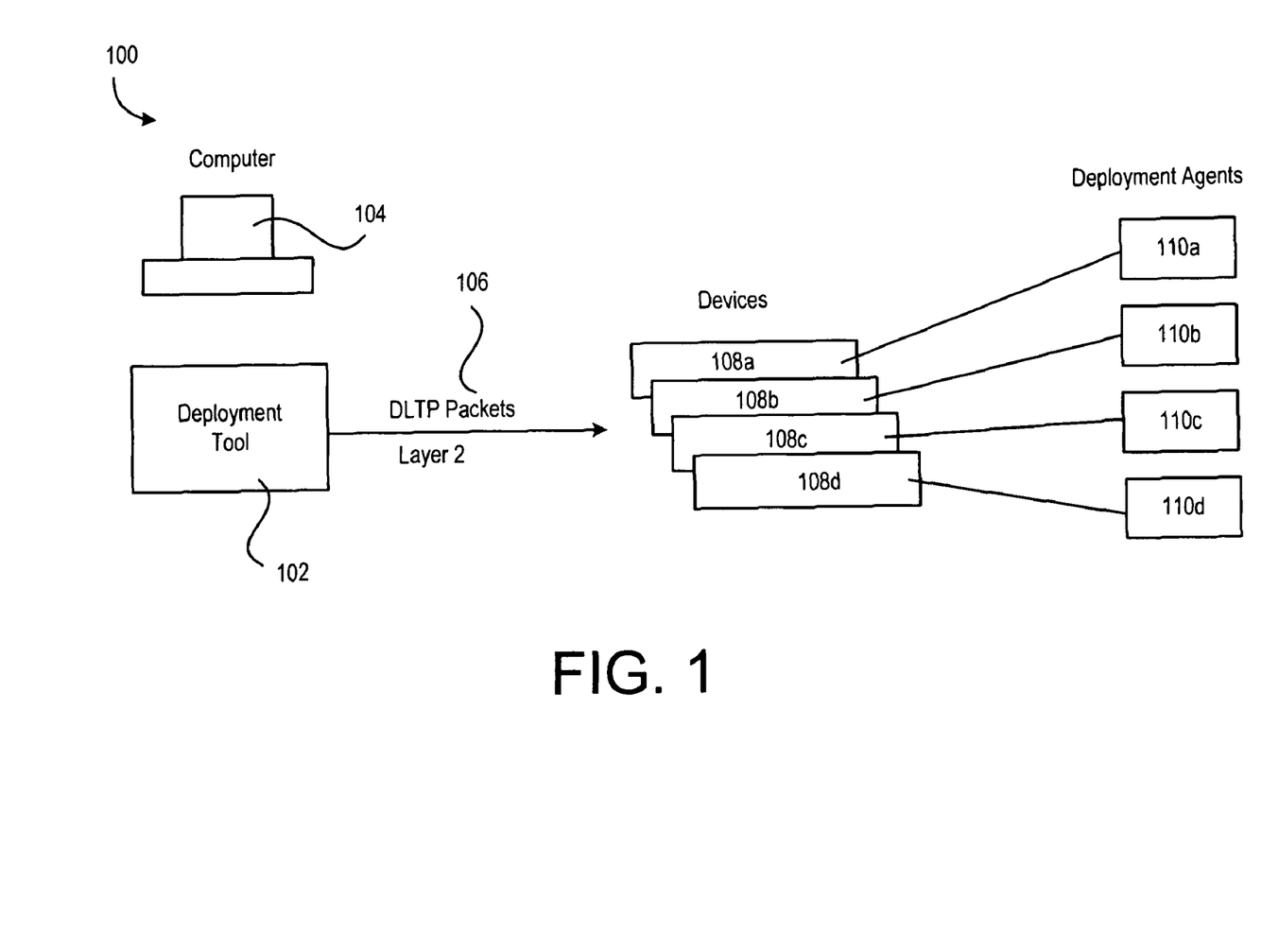
FIG. 1 shows, in accordance with an embodiment of the present invention, an arrangement for configuring multiple devices using layer 2.

FIG. 1 shows, in accordance with an embodiment of the present invention, an arrangement 100 for configuring multiple devices using layer 2. A deployment tool 102 is provided in a configuring computer 104. Deployment tool 102 is configured to transmit and receive DLTP packets (106) using layer 2 with a plurality of connected devices 108a-108d. Devices 108a-108d represent devices to be configured and are connected in the same network segment as configuring computer 104. A network segment refers to a logical or physical network segment in which a configuring computer and the device can address one another uniquely at layer 2 using a unique ID such as a MAC (media access controller) address, a serial number, etc.

Deployment agents 110a-110d are implemented on respective devices 108a-108d and are configured to exchange DLTP packets with configuring computer 104. Through the use of DLTP packets and more particularly through values in fields of DLTP packets, configuring computer 104 may establish communication with the connected devices at layer 2 and may provide configuration data to enable to deployment agents at the devices to receive the configuration data and to perform configuration at the devices.

Figure 2:
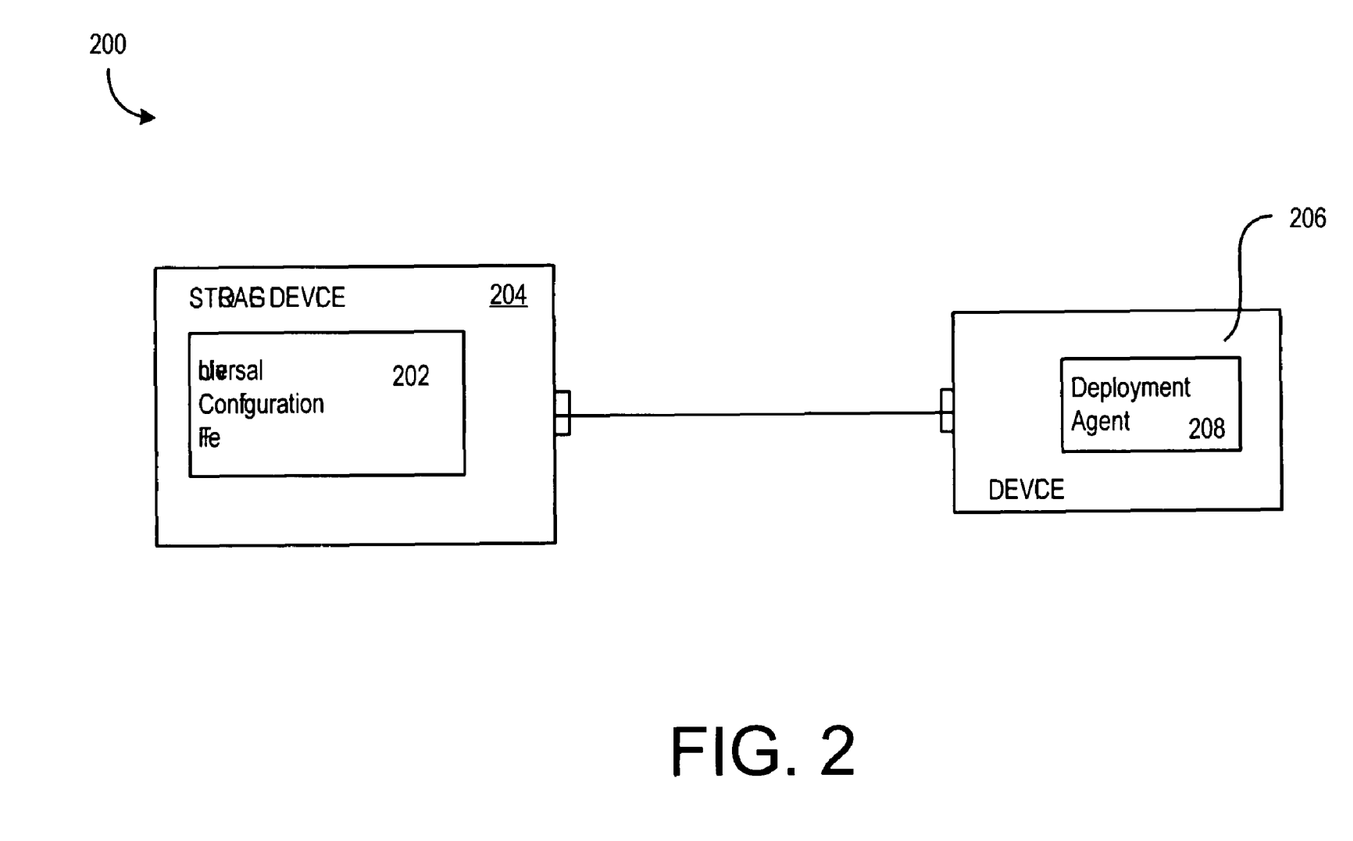
FIG. 2 shows, in accordance with an embodiment of the invention, an alternative arrangement for configuring multiple devices.

FIG. 2 shows, in accordance with an embodiment of the invention, an alternative arrangement 200 for configuring multiple devices. In the example of FIG. 2, a universal configuration file 202 is provided on a portable storage device 204, such as an external hard drive, an external opto-magnetic storage device, a flash memory storage device, etc. To configure a device 206, portable storage device 204 is coupled to a port on device 206. For example, some devices may be provided with a USB port into which portable storage device may be plugged. A deployment agent 208 in device 206 may then read the configuration data for device 206 (which may be associated with the MAC address or a unique ID for device 206 in universal configuration file 202). The configuration data may be provided to the device using layer 2 DLTP packets, for example. With the configuration data, deployment agent 208 may then configure device 202.

Figure 3:
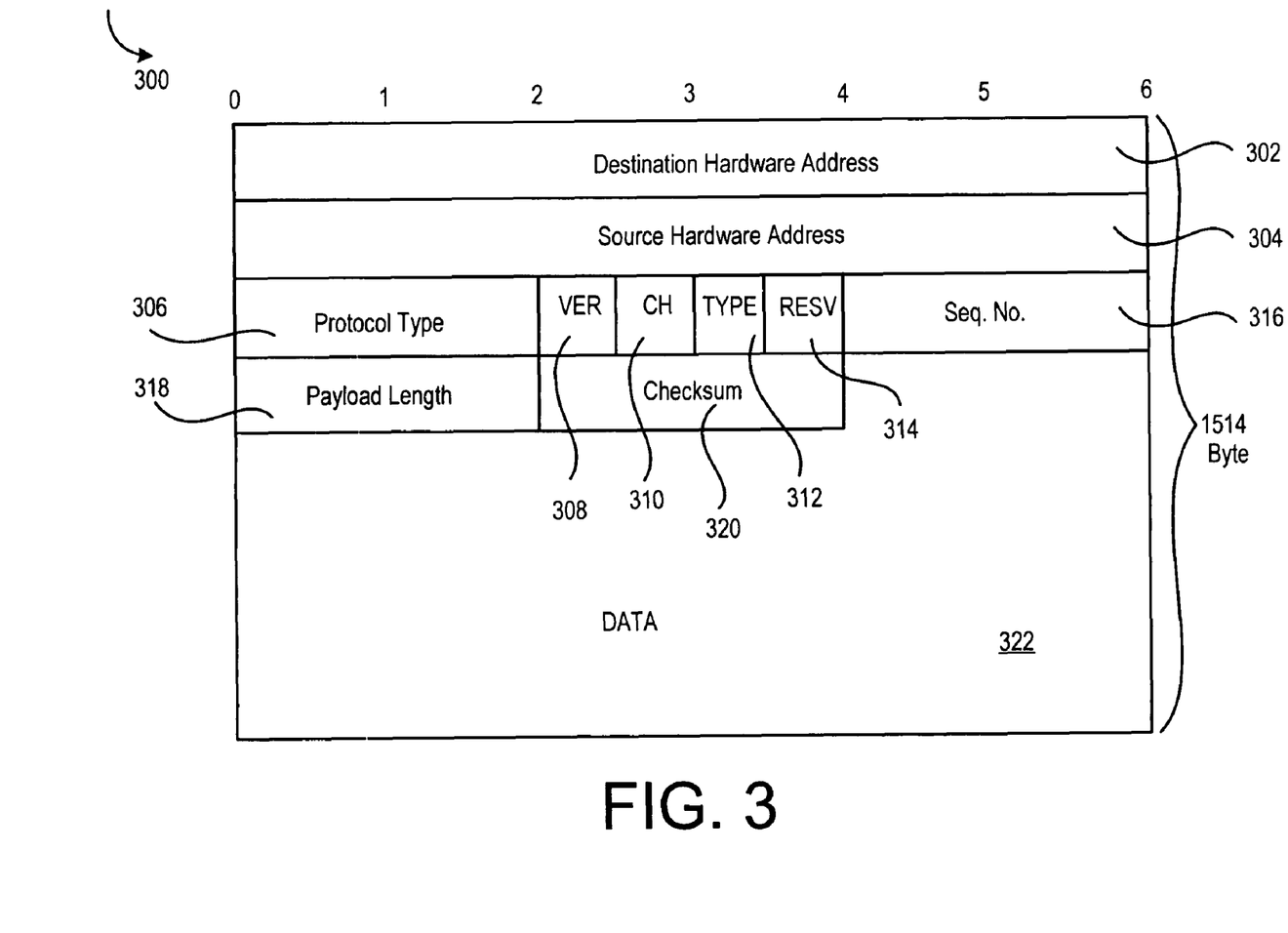
FIG. 3 shows in accordance with an embodiment of the present invention, an example of a DLTP packet, representing the data packet exchanged between the configuring computer and the device for the purpose of configuring the device.

FIG. 3 shows in accordance with an embodiment of the present invention, an example of a DLTP packet, representing the data packet exchanged between the configuring computer and the device for the purpose of configuring the device. As can be seen, DLTP packet 300 includes a plurality of fields. In the example of FIG. 3, a destination hardware address field 302 has 6 bytes (48 bits) and may be employed to store the unique ID (e.g., MAC address) of the device to be configured. A source hardware address field 304 has 6 bytes (48 bits) and may be employed to store the unique ID (e.g., MAC address) of the configuring computer.

Protocol type field 306 has 2 bytes and identifies the packet as a DLTP packet. Version field 308 (VER) has 4 bytes for identifying the version number of the DLTP protocol with which a given DLTP packet conforms.

Channel field 310 (CH) has 4 bytes and identifies the channel with which a given DLTP packet is associated. Different channels may be employed for different purposes as discussed later herein. For example, channel field 310 (CH) may have a value 0xF, indicating that the DLTP packet is being sent on a broadcast channel and addresses all devices connected to the network segment. Channel field 310 (CH) may, in another example, has the value of 0x3, representing that the DLTP being sent is addressed to all devices assigned to channel 3, which may only be a subset of all devices to be configured. Channel field 310 (CH) may, in another example, has the value of 0x7, representing that the DLTP being sent is addressed to all devices assigned to channel 7, which may be another subset of all devices to be configured. By providing for different communication channels, it is possible to communicate not only with each individual device or all devices but also with arbitrarily assigned groups of devices.

Type field 312 has 4 bytes and identifies the DLTP packet type. For example, a Type 1 may indicate that the DLTP packet contains data; a Type 2 may indicate that the DLTP packet is an acknowledgement (ACK) packet; a Type 3 may indicate that the DLTP packet is an error packet (ERROR). The error packet may be sent to request retransmission of a corrupted received packet, for example. A Type 4 may indicate that the DLTP packet is an end packet (END), which signifies the conclusion of the transmission of a group of related packets; a Type 5 may indicate that the DLTP packet is a not acknowledged (NOACK) packet.

Other types may exist in addition to and/or as alternatives to those mentioned above. For example, a Type 0xFE may indicate that the DLTP packet is being employed to transmit the source MAC address of the configuring computer, and a Type 0xFF may indicate that the DLTP packet is being employed as a broadcast packet (preferably on a broadcast channel) destined for all devices.

In an embodiment, reservation field 314 has 4 bytes, it is employed to specify the number of DLTP packets in a burst. If the value of reservation field is 10, for example, 10 DLTP packets would be bursted and the sender only expects an ACK packet after all packets of the bursts are received by the receiver.

Sequence Number filed 316 has 2 bytes and is employed to store the sequence number of the DLTP packet if multiple DLTP packets are employed to transmit a particular file (e.g., a configuration file for a particular device). Using the sequence number, the configuring computer and/or the device may ascertain whether all packets have been received and may correctly assemble the received file or message based on the sequence numbers of the received DLTP packets.

Payload Length field 318 has 2 bits and contains a value that reflects the length of the payload carried by payload field 322. In an embodiment, payload field 322 may be as large as 1492 bytes although the sizing of payload field 322 may be implementation specific and may be larger or smaller as needed. Checksum field 320 has 2 bits and contains a value that may reflect the checksum of the entire DLTP packet 300. It should be understood that the fields discussed herein are examples and have example lengths suitable for the general configuration of devices. In a specific implementation, fewer or additional fields may be provided, and the length of each field may be varied as desired.

Figure 4:
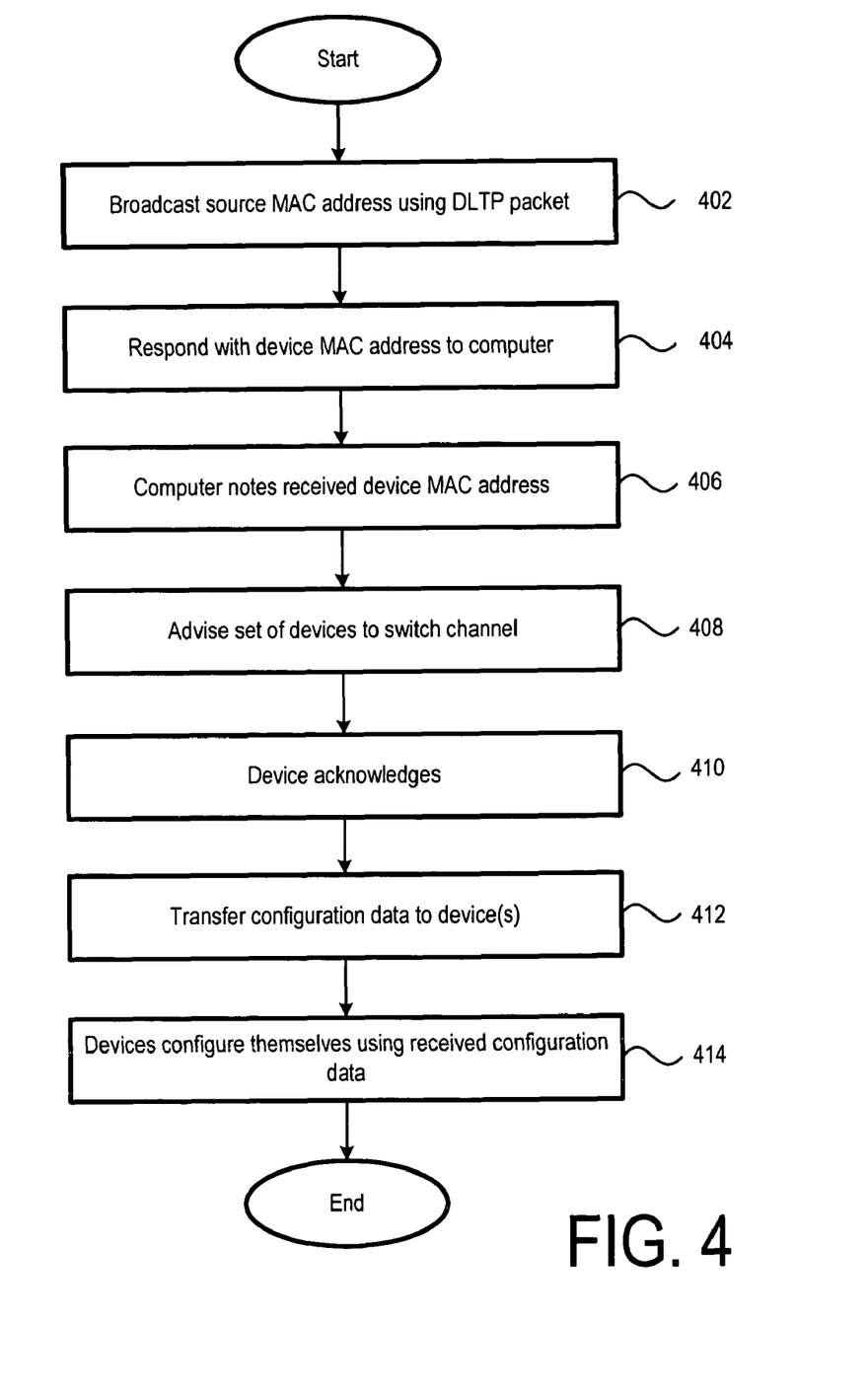
FIG. 4 illustrates, in accordance with an embodiment of the present invention, the steps employed for configuring devices using layer 2.

FIG. 4 illustrates, in accordance with an embodiment of the present invention, the steps employed for configuring devices using layer 2. Generally speaking, the deployment tool has access to a file, a table or a database (known as the global configuration file) that contains the configuration parameters for the devices and associated device MAC addresses. Using this global configuration file and the method of FIG. 4, the configuring computer communicates with the devices at layer 2 and enables the configuration of the devices simultaneously.

In step 402, the configuring computer employs the deployment tool application to create and broadcast a source MAC address DLTP packet. Preferably, the broadcast is performed on a broadcast channel (as specified by the channel field CH in the DLTP packet). The source MAC address, representing the MAC address of the configuring computer and transported in the payload of the broadcasted source MAC address DLTP packet, informs all devices of the source MAC address. Alternatively, the deployment agent may extract the computer's MAC address from the "Source Hardware Address" field of the DLTP packet sent from the device.

In step 404, the deployment agent in each device creates and transmits a response DLTP packet to the configuring computer. Each response DLTP packet may employ the broadcast channel for the response and may specify as its destination the MAC address of the configuring computer. Further, the response DLTP packet may carry in its payload the device's MAC address or the deployment tool may extract the device's MAC address from the "Source Hardware Address" field of the DLTP packet sent from the devices.

In step 406, the deployment tool in the configuring computer takes note of the received device MAC addresses for later configuration usage. Steps 404 and 406 comprise the network discovery process that ascertains the devices to be configured.

As part of the negotiation process in preparation for the actual configuration data transfer, the deployment tool may, in step 408, send using the broadcast channel DLTP packets to a set of devices (which may be 1 or more devices) to advise these devices to listen to a different channel for data transfer. Once the device(s) acknowledge (410), the deployment tool may begin transferring (412) the configuration data, using DLTP packets, to the set of devices using the channel specified earlier.

For each device, the configuration data is obtained from the global configuration file using the received MAC address as an access key. Different sets of devices may be communicated using different channels. DLTP packets may be broadcasted to these devices on the specified channel, and each device may monitor the "Destination Hardware Address" field for DLTP packets destined for it. Further, the configuring computer may transfer the whole global configuration file to each device and rely on the device to extract the configuration data appropriate to itself (based on matching unique IDs) or the configuring computer may transfer to a device only the configuration data specific to that device.

Once configuration data transfer is completed, the deployment agent in each device may begin configuring (414) the device using the received configuration data. Although MAC address is discussed as the addressing mechanism in the examples herein, any unique ID that is unique may be employed.

Figure 5:
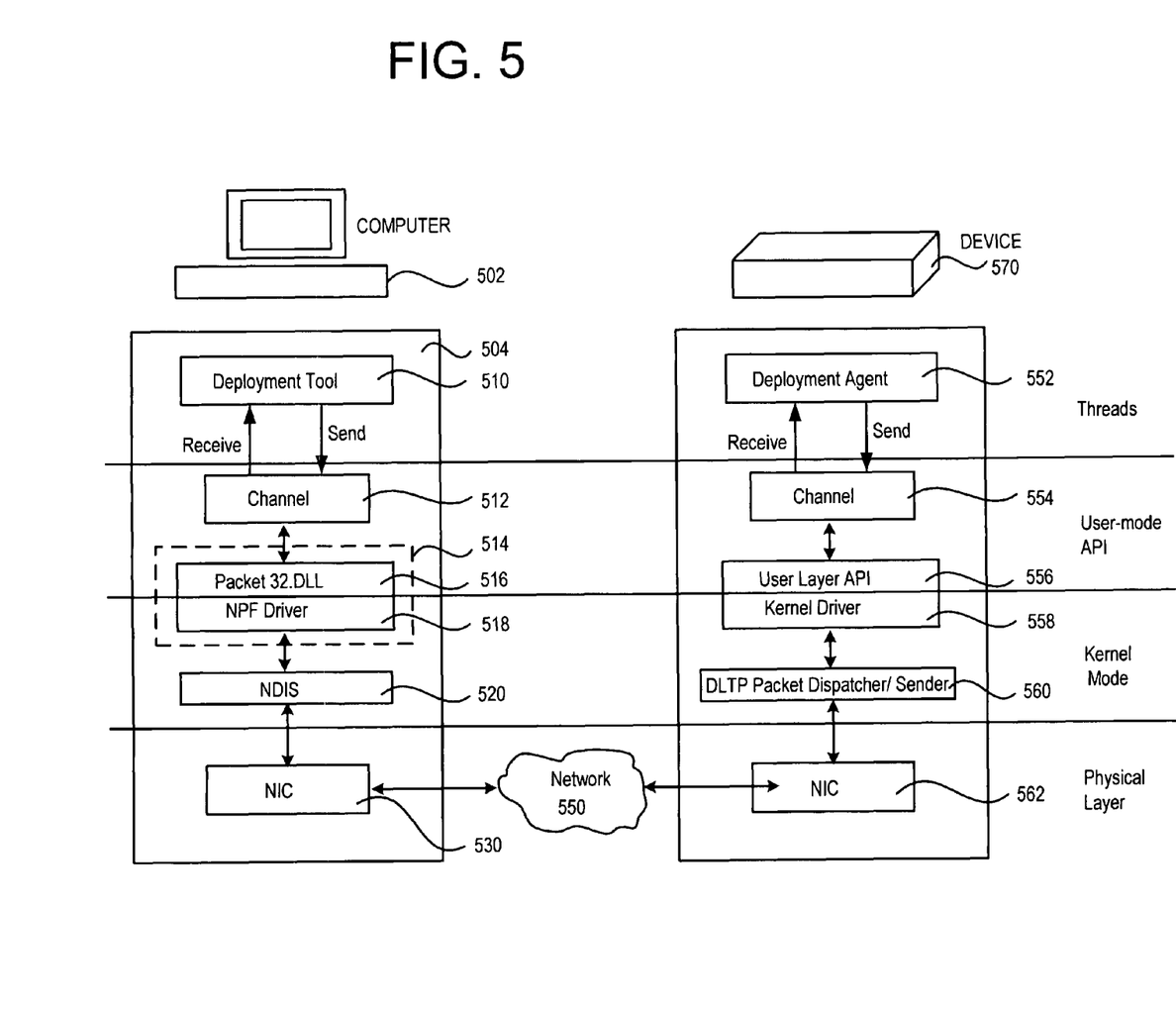
FIG. 5 illustrates, in accordance with an embodiment of the invention, another arrangement for configuring a device.

FIG. 5 illustrates, in accordance with an embodiment of the invention, an arrangement 502, representing an arrangement for configuring a device. Although only a single device is shown in FIG. 5 to avoid cluttering up the figure, it should be understood that the technique discussed applies to the configuration of multiple simultaneously connected devices.

Referring to FIG. 5, there is shown a configuring computer 502, representing the computer that is connected to the network segment for transferring via layer 2 the configuration data to the deployment agent disposed at each device. Method 504 executes using computer 502 to facilitate the transfer of the configuration data to the device (570). A deployment tool 510 represents an application program executing in the application space of computer 502. Deployment tool 510 may be employed to, for example, generate the data fields for DLTP packets to be transmitted during the network discovery process (to ascertain the devices connected to the network), during the negotiation process, or during the actual configuration data transfer. Channel selection block 512 represents the logic block for selecting the value representing the channel over which the DLTP packets would be sent.

A network packet engine 514 comprising a user-layer library 516 and an NPF (Network Packet Filter) kernel driver 518 is employed to packetize the data for sending and receiving DLTP packets via a lower level network layer. In an embodiment, a commercially available open-source engine known as pwincap (www.pwincap.com) is employed as network packet engine 514. In the case of a WINDOWS™-based computer (based on the WINDOWS™ OS platform, available from Microsoft Corporation of Redmond, Wash.), a NDIS driver 520 is employed to communicate between the NPF kernel driver 518 and the physical layer represented by a NIC (network interface card) 530. Similar drivers exist for other platforms, such as LINUX™, UNIX™, APPLE™, etc. NPF kernel driver 518 may be thought of as the kernel protocol driver that interfaces with the NDIS wrapper to send and receive packets with the network via the NIC driver. Through library 516 and kernel driver 518 of network packet engine 514, NDIS driver 520, and NIC 530, deployment tool application 510 may send and receive DLTP packets via network 550.

On the device side, a deployment agent 552 represents the software/firmware implementing the application program to monitor for DLTP network discovery and negotiation packets from the configuring computer. Deployment agent 552 further represents the software to process the received configuring computer MAC address, to respond with the MAC address of the device, to receive the configuration data using the channel specified by the deployment tool of the configuring computer, and to configure the device with the received configuration data. Channel selector logic 554 is employed to select the channel for communication with the configuring computer responsive to instructions from the configuring computer.

To facilitate communication with network 550 (and configuration computer 502), user-layer API 556, kernel mode driver 558, and DLTP packet dispatcher/sender 560 are employed to packetize and/or disassemble the DLTP packets. The functions of these APIs/drivers are analogous to their counterparts in the configuring computer: they permit the user-layer deployment agent 552 to communicate with network 550 via the physical layer (represented by NIC 562). If desired, a character device driver may be provided to access DLTP packet dispatcher/sender 560 to receive/transmit data and to block processes while waiting for replies.

As can be appreciated from the foregoing, embodiments of the invention enable devices to be configured even if they do not have IP addresses or the proper protocol drivers to communicate with the configuring computer using the browser (e.g., at layer 3). Further, there is no need to temporarily set the configuring computer's IP address to that required for configuration of the attached device and to reset the computer's IP address back when configuration is complete. Additionally, embodiments of the invention render it possible to configure multiple devices automatically from the console of the configuring computer without having to manually configure each device one-by-one as in the case with the prior art.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for configuring a set of devices coupled to a computer, the method comprising;
    broadcasting at least a first set of packets from said computer to said set of devices, each of said first set of packets including at least a first identifier, said first identifier being associated with said computer, said first set of packets complying with a Data Link Layer protocol according to the Open System Interconnection Model;
    receiving a set of device identifiers at said computer, each of said set of device identifiers being associated with a device of said set of devices, said set of device identifiers being contained in a set of response packets, said set of response packets being created by said set of devices in response to said first set of packets, said set of response packets being transmitted using said first identifier, said set of response packets complying with said Data Link Layer protocol;
    sending, using a broadcast channel, a set of Data Link Transport Protocol (DLTP) packets to a first plurality of devices to advise said first plurality of devices to switch from at least a used channel to a first channel, said set of DLTP packets including at least a first DLTP packet, said first DLTP packet including at least a reservation field, a value of said reservation field specifying a number of DLTP packets in a burst, said burst including said set of DLTP packets;
    receiving acknowledgement from said plurality of devices about switching to said first channel; and
    sending, using said first channel, a first set of configuration packets from said computer to said first plurality of devices for simultaneously configuring said first plurality of devices, said first plurality of devices being at least a first subset of said set of devices, said first plurality of devices being assigned to said first channel, said first set of configuration packets identifying said first channel, said first set of configuration packets complying with said Data Link Layer protocol.

2. The method of claim 1 further comprising:
    receiving a first device identifier at said computer, said first device identifier being associated with a first device of said set of devices, said first device identifier being contained in a first response packet created by said first device in response to a packet of said first set of packets, said first response packet complying with said Data Link Layer protocol; and
    sending a first configuration packet from said computer to said first device for configuring said first device, said first configuration packet identifying said first device identifier, said first configuration packet containing configuration data specific to said first device, said first configuration packet complying with said Data Link Layer protocol.

3. The method of claim 1 further comprising:
    sending a second set of configuration packets from said computer to a second plurality of devices for simultaneously configuring said second plurality of devices, said second plurality of devices being at least a second subset of said set of devices, said second plurality of devices being assigned to a second channel, said second set of configuration packets identifying said second channel, said second set of configuration packets complying with said Data Link Layer protocol.

4. The method of claim 1 wherein said first DLTP packet further includes at least a channel field, content of said channel field identifying said used channel, and wherein said first DLPT packet further includes a protocol type field, content of said protocol field identifying said first DLTP packet as a DLTP packet.

5. The method of claim 1 wherein said first DLTP packet further includes at least a sequence number field, said sequence number field storing a sequence number of said first DLTP packet used for assembling a file.

6. The method of claim 1 wherein said broadcasting is performed at the Data Link Layer according to the Open System Interconnection Model without using the Network Layer according to the Open System Interconnection Model.

7. The method of claim 1 wherein said first identifier is stored in a payload field of said each of said first set of packets.

8. The method of claim 1 wherein one or more of said first plurality of devices do not have a protocol driver for communicating with said computer at the Network Layer according to the Open System Interconnection Model.

9. A method for configuring a set of devices using a computer, the method comprising:
    receiving at said set of devices a first set of packets broadcasted from said computer, each of said first set of packets including at least a first identifier, said first identifier being associated with said computer, said first set of packets complying with a Data Link Layer protocol according to the Open System Interconnection Model;
    creating, using said set of devices, a set of response packets in response to said first set of packets, said set of response packets containing a set of device identifiers, each of said set of device identifiers being associated with a device of said set of devices, said set of response packets complying with said Data Link Layer protocol;
    transmitting said set of response packets from said set of devices to said computer using said first identifier;
    receiving at a first plurality of devices a set of Data Link Transport Protocol (DLTP) packets advising said first plurality of devices to switch from at least a used channel to a first channel, said set of DLTP packets being received from said computer using a broadcast channel, said set of DLTP packets including at least a first DLTP packet, said first DLTP packet including at least a reservation field, a value of said reservation field specifying a number of DLTP packets in a burst, said burst including said set of DLTP packets;

switching said plurality of devices to said first channel;

receiving at said first plurality of devices a first set of configuration packets sent from said computer using said first channel, said first plurality of devices being at least a first subset of said set of devices, said first plurality of devices being assigned to said first channel, said first set of configuration packets identifying said first channel, said first set of configuration packets complying with said Data Link Layer protocol; and simultaneously configuring said first plurality of devices using configuration data contained in said first set of configuration packets.

10. The method of claim 9 further comprising:

extracting device-specific configuration data from said configuration data for each device of said first plurality of devices; and configuring said each device of said first plurality of devices using said device-specific configuration data for said each device of said first plurality of devices.

11. The method of claim 10 wherein said extracting includes matching a device identifier of said each device of said first plurality of devices with a corresponding device identifier contained in said configuration data.

12. The method of claim 9 wherein said first set of packets is broadcasted at the Data Link Layer according to the Open System Interconnection Model without using the Network Layer according to the Open System Interconnection Model.

13. The method of claim 9 wherein said first DLTP packet further includes at least a protocol type field, content of said protocol field identifying said first DLTP packet as a DLTP packet.

14. The method of claim 9 further comprising:

receiving at a second plurality of devices a second set of configuration packets sent from said computer, said second plurality of devices being at least a second subset of said set of devices, said second plurality of devices being assigned to a second channel, said second set of configuration packets identifying said second channel, said second set of configuration packets complying with said Data Link Layer protocol;

simultaneously configuring said second plurality of devices using configuration data contained in said second set of configuration packets; and simultaneously configuring said first plurality of devices and said second plurality of devices.

15. The method of claim 9 wherein said first DLTP packet further includes at least a channel field, content of said channel field identifying said used channel.

* * * * *